US010096306B2

(12) United States Patent
Akazawa et al.

(10) Patent No.: US 10,096,306 B2
(45) Date of Patent: Oct. 9, 2018

(54) INPUT SUPPORT APPARATUS AND METHOD THEREFOR

(71) Applicant: Yamaha Corporation, Hamamatsu-shi, Shizuoka-ken (JP)

(72) Inventors: Eiji Akazawa, Hamamatsu (JP); Kozue Sakaguchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/468,422

(22) Filed: Mar. 24, 2017

(65) Prior Publication Data
US 2017/0278495 A1  Sep. 28, 2017

(30) Foreign Application Priority Data

Mar. 25, 2016 (JP) .................... 2016-061715

(51) Int. Cl.
| G04B 13/00 | (2006.01) |
| G10H 1/00 | (2006.01) |
| G06F 3/147 | (2006.01) |
| G10G 1/02 | (2006.01) |
| G06F 3/0484 | (2013.01) |

(52) U.S. Cl.
CPC .......... *G10H 1/0008* (2013.01); *G06F 3/147* (2013.01); *G10G 1/02* (2013.01); *G06F 3/04842* (2013.01); *G10H 2210/105* (2013.01); *G10H 2210/571* (2013.01); *G10H 2220/106* (2013.01); *G10H 2220/121* (2013.01)

(58) Field of Classification Search
CPC .......... G10H 1/0008; G10H 2210/105; G10H 2210/571; G10H 2220/106; G10H 2220/121; G06F 3/147; G06F 3/04842; G10G 1/02
USPC .......................................................... 84/609
See application file for complete search history.

(56) References Cited

U.S. PATENT DOCUMENTS

2013/0233155 A1\* 9/2013 Little .................. G10H 1/0016
84/609

FOREIGN PATENT DOCUMENTS

| JP | 2000-259151 A | 9/2000 |
| JP | 2005-84065 A | 3/2005 |

\* cited by examiner

*Primary Examiner* — Jianchun Qin
(74) *Attorney, Agent, or Firm* — Crowell & Moring LLP

(57) ABSTRACT

An input support method is provided for use in an input support apparatus that supports input of a music note. The method includes: controlling a display unit to display a pitch-time plane that includes a pitch-axis and a time-axis, a chord sequence that is associated with the time-axis of the pitch-time plane, and a pointer that indicates a position on the time-axis along the chord sequence; identifying constituent music notes that form a chord corresponding to a display position of the pointer along the chord sequence; and controlling the display unit to display areas on the pitch-time plane, each displayed area indicating a corresponding one of the identified constituent music notes, differently from other areas on the pitch-time plane.

14 Claims, 6 Drawing Sheets

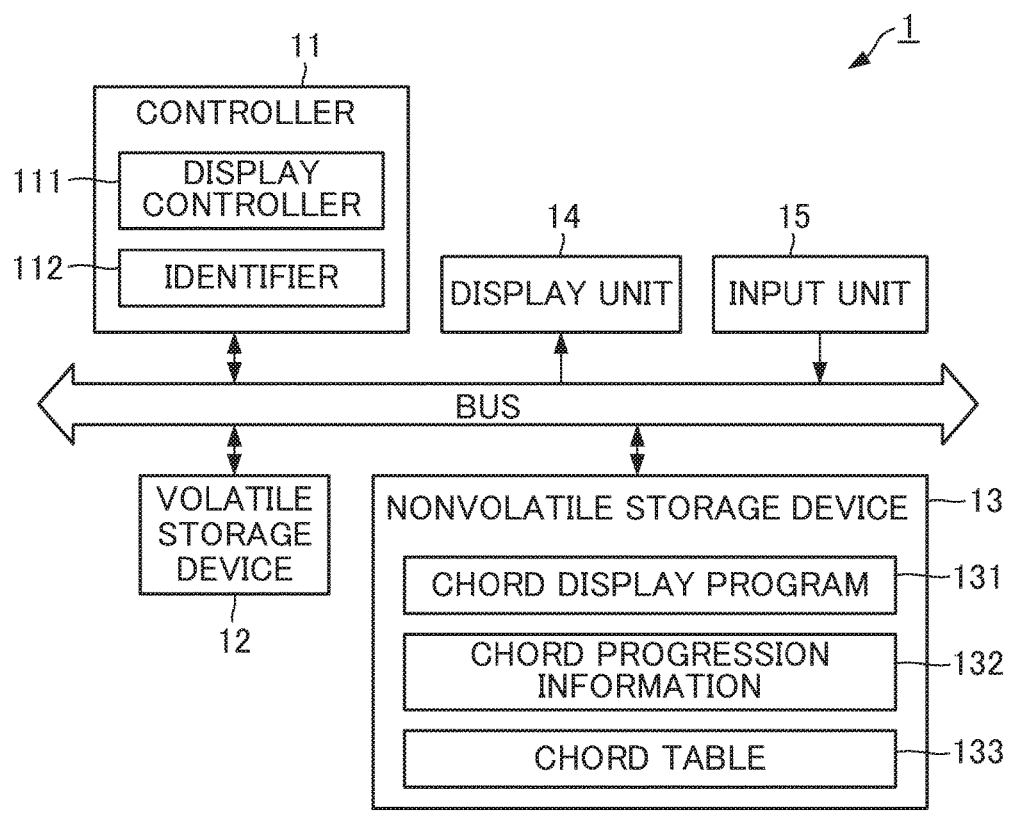

FIG. 3

| CHORD NAME | CONSTITUENT MUSIC NOTES |
|---|---|
| C | C<br>E<br>G |
| D | D<br>F#<br>A |
| E | E<br>G#<br>B |
| F | F<br>A<br>C |
| G | G<br>B<br>D |

INPUT SUPPORT APPARATUS AND METHOD THEREFOR

BACKGROUND OF THE INVENTION

Field of the Invention

The present invention relates to an input support apparatus that supports input of music notes, and to an input support method therefor in the field of computer music (commonly referred to as "desk top music" (DTM)).

Description of the Related Art

In recent years, pupils have been given opportunities to compose music in a music class in elementary and middle schools. In such a composition class a teacher may, for example, provide a chord progression as an accompaniment over which pupils create a melody that matches the chord progression. In doing so, the teacher may provide to the pupils a handout that contains names of the chords that make up the chord progression of the accompaniment along with information on corresponding constituent music notes for each of the chords. The teacher may further provide advice, such as "in a measure that contains accompaniment chord C major, select a note from among the constituent music notes of the chord C major, namely, the notes C, E, and G, to create a melody". When a note is selected from among constituent music notes, to create a melody, for each chord comprising a part of the accompaniment chord progression, consonant notes will be chosen, thereby avoiding dissonance between the melody and the accompaniment and thus enabling a natural sounding piece of music to be created.

In the above-described example, a drawback exists in that an amount of work that is required of the teacher may be substantial. For example, the teacher will need to prepare in advance handouts in which accompaniment chords along with their constituent music notes are set out.

Japanese Patent Application Laid-Open Publication No. 2000-259151 (hereinafter referred to as "Patent Literature 1") discloses an automatic accompaniment apparatus. Keys of this automatic accompaniment apparatus are each provided with a light-emitting means. The automatic accompaniment apparatus sequentially retrieves chord data of chords to be played in synchronization at a designated tempo. According to the retrieved chord data, the automatic accompaniment apparatus causes light-emitting means of to-be-pressed keys to glow at a correct timing so as to guide a user's key-pressing operation.

However, it is not suitable to use the automatic accompaniment apparatus of Patent Literature 1 for composing music. This is because, although the automatic accompaniment apparatus of Patent Literature 1 enables a user to identify a specific key to press at a correct timing when playing a piece of music, no information is provided to the user on a chord progression of an accompaniment piece of music.

SUMMARY OF THE INVENTION

In view of the above-described matters, an object of the present invention is to assist a user in composing music, thereby alleviating a burden on the user.

The present invention provides a method for use in an input support apparatus. This method includes: controlling a display unit to display a pitch-time plane that includes a pitch-axis and a time-axis, a chord sequence that is associated with the time-axis of the pitch-time plane, and a pointer that indicates a position on the time-axis along the chord sequence; identifying constituent music notes that form a chord corresponding to a display position of the pointer along the chord sequence; and controlling the display unit to display areas on the pitch-time plane, each displayed area indicating a corresponding one of the identified constituent music notes of the chord, differently from other areas on the pitch-time plane. The present invention also provides an input support apparatus in which the above-stated input support method is used.

BRIEF DESCRIPTION OF THE DRAWINGS

FIG. 1 is a block diagram illustrating a configuration of an input support apparatus 1 according to a first embodiment of the present invention.

FIG. 2 is a diagram illustrating an example of chord progression information 132 for the input support apparatus 1.

FIG. 3 is a diagram illustrating an example of a chord table 133 for the input support apparatus 1.

DESCRIPTION OF THE EMBODIMENTS

Figure 4:
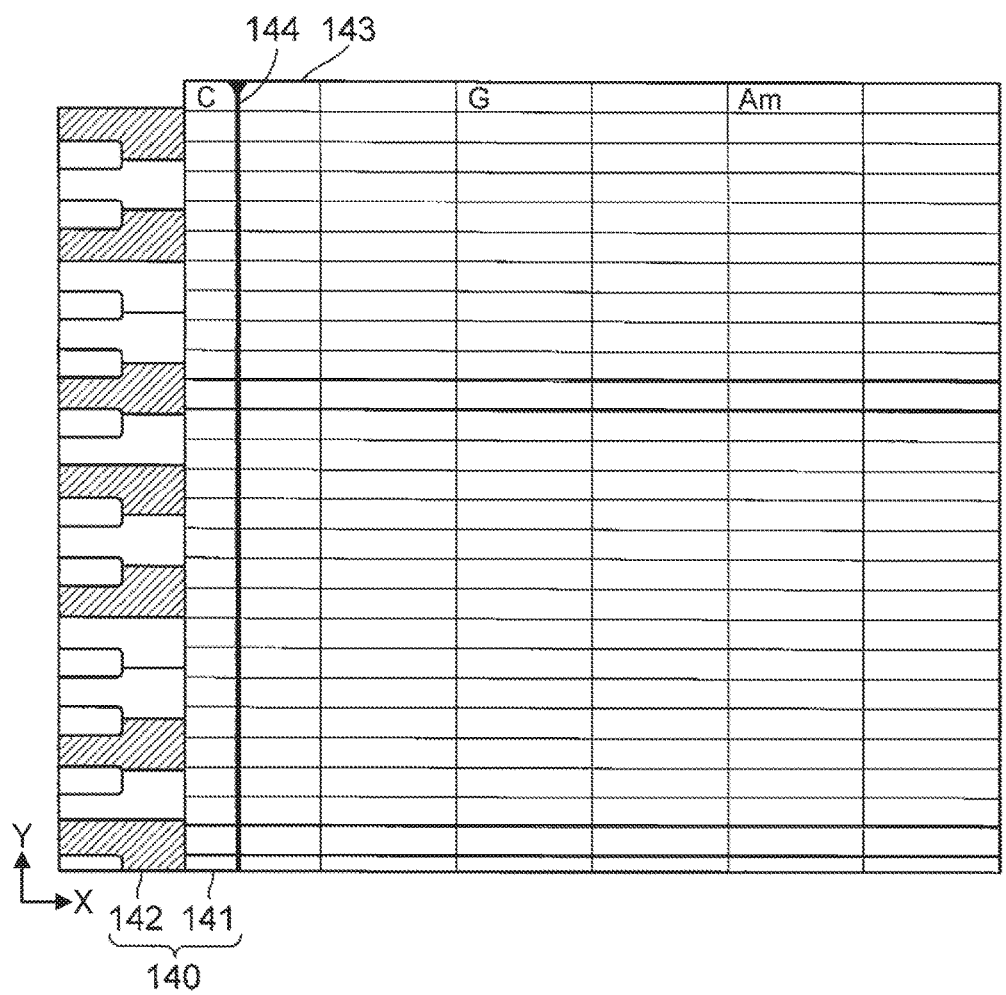
FIG. 4 is a diagram illustrating an example screen on a display unit 14 of the input support apparatus 1.

Hereinafter, embodiments of the present invention will be described with reference to the accompanying drawings.

First Embodiment

FIG. 1 is a block diagram illustrating a configuration of an input support apparatus 1 according to a first embodiment of the present invention. The input support apparatus 1 is an apparatus that provides support to a user such that the user is able to easily determine a music note for input in an operation of composing music using a DTM technique. When chords of an accompaniment are pre-determined, the input support apparatus 1 displays choices of preferred music notes, the choices having been narrowed down to constituent music notes for the chords of the accompaniment, thereby assisting the user in selecting music notes to play in a melody over the chords of the accompaniment. More details on the input support apparatus 1 will be given later. The input support apparatus 1, as with a personal computer, a tablet terminal, or the like, includes a controller 11, a volatile storage device 12, a nonvolatile storage device 13, a display unit 14, and an input unit 15.

The input unit 15 and the display unit 14 are user interfaces. The input unit 15 is a mouse or a keyboard, for example. The input unit 15 receives a user's operation and supplies to the controller 11 data that indicates content of the operation. The display unit 14 is a display means for displaying on a screen content or the like indicated by various data. The input unit 15 and the display unit 14 may be realized by a device, such as a touch panel, that has the function of the input unit 15 and the function of the display unit 14.

The controller 11 is a central processing unit (CPU), for example. The controller 11 is a control center that controls the elements of the input support apparatus 1 by executing a program stored in the nonvolatile storage device 13. The controller 11 includes a display controller 111 and an identifier 112.

The volatile storage device 12 is a random access memory (RAM), for example. The volatile storage device 12 is used as a work area by the controller 11. The nonvolatile storage device 13 is a hard disk drive, for example. The nonvolatile storage device 13 stores a chord display program 131, chord progression information 132, and a chord table 133.

FIG. 2 illustrates an example of the chord progression information 132. The chord progression information 132 is information that indicates a chord in each of sections into which a music piece is divided, with each section having a predetermined time length. The chord progression information 132 is created, for example, as a comma separated values (CSV) file. In this case, fields separated by commas, which are separators, correspond to the sections of the predetermined time length. The predetermined time length used for the music piece (that is, the unit of the fields separated by commas in the chord progression information 132) is, for example, a beat with the beat including a rest. In the example of FIG. 2, the first line of the chord progression information 132 includes configuration information, such as that indicating that a quarter note lasts for one beat. The second line of the chord progression information 132 includes commas, which are separators, and chord names. When no chord name is given in a field separated by commas or a blank appears, the previous chord continues. The chord progression information 132 in the example of FIG. 2 indicates a chord progression where the chord "C" continues for four beats, then the chord "G" continues for four beats, then the chord "Am" continues for four beats, and so on. When the input support apparatus 1 is used in a composition class, the chord progression information 132 is created in advance by a teacher, for example, and stored in the nonvolatile storage device 13. For each chord progression pattern that is given to pupils as an assignment, the teacher may update the chord progression information 132, or add another piece of chord progression information 132 to the nonvolatile storage device 13.

FIG. 3 is a diagram illustrating an example of the chord table 133. The chord table 133 is a table in which chords are associated together with data on their constituent music notes. The chord table 133 stores data indicating constituent music notes of various chords, such as major chords, minor chords, tension chords, and fraction chords. For example, the notes C, E, and G are associated with the chord C major, and the notes G, B, and D are associated with the chord G major.

The controller 11 executes the chord display program 131 to enable an apparatus, such as a personal computer or a tablet terminal to function as the input support apparatus 1 and implement the DTM technique. Processing executed by the controller 11 in accordance with the chord display program 131 will be described later in detail when operation of the input support apparatus 1 is described.

By executing the chord display program 131, the controller 11 provides a graphical user interface (GUI), such as a piano roll screen illustrated as an example in FIG. 4. A pitch-time plane 140, that includes a piano roll 141 and a keyboard 142, a chord sequence 143, and a pointer, such as a song position pointer 144, are displayed on the piano roll screen.

The pitch-time plane 140 is a two-dimensional plane that includes a pitch-axis corresponding to a note pitch and a time-axis corresponding to a time in a music piece. In FIG. 4, the X-axis (i.e., the horizontal direction) corresponds to the time-axis, and the Y-axis (i.e., the vertical direction) corresponds to the pitch-axis. More specifically, the vertical direction of the piano roll 141 of the pitch-time plane 140 corresponds to the pitch-axis, and the horizontal direction of the piano roll 141 corresponds to the time-axis. On the left of the piano roll 141, the keyboard 142 is displayed, in which the vertical direction (i.e., the Y-axis) corresponds to the pitch-axis. Specifically, keys of the keyboard 142, which indicate note pitches, are arranged in the vertical direction. Each note pitch of the piano roll 141 is associated with a corresponding key of the keyboard 142. The piano roll 141 and the keyboard 142 are displayed coupled to each other in such a way that the correspondence between the note pitches of the piano roll 141 and the keys of the keyboard 142 can be seen with ease. The pitch-time plane 140 (more specifically, the piano roll 141) accepts input of music notes according to an operation on the input unit 15. In the example piano roll 141 shown in FIG. 4, a separator line is displayed every half-measure.

The chord sequence 143 is displayed on the top of the piano roll 141. The chord sequence 143 is a sequence in which chords of an accompaniment of a music piece are arranged in accordance with progress of the music piece. Specifically, the chord sequence 143 is displayed based on the chord progression information 132. The horizontal axis of the chord sequence 143 along which the chords are arranged is associated with the time-axis of the pitch-time plane 140. In the example of FIG. 4, the chords "C", "G", and "Am" are arranged and displayed in accordance with the progress of the music piece. In a portion that is left blank in the area where the chord sequence 143 is displayed, the chord displayed in the area previous to the blank area is continued. For example, the chord "C" continues in the blank between "C" and "G", and the chord "G" continues in the blank between "G" and "Am". In the example of FIG. 4, similarly to the piano roll 141, a separator line is displayed every half-measure in the display area of the chord sequence 143. Thus, each of the chords "C", "G", and "Am" continues for one measure, one after another.

In the area where the piano roll 141 is displayed and the area where the chord sequence 143 is displayed, the song position pointer 144 is displayed that extends in the vertical direction (in the Y-axis direction) across these display areas. The song position pointer 144 indicates a playback position in the music piece. The song position pointer 144 can move in the horizontal direction (in the X-axis direction; i.e., forward and backward directions of the music piece) in response to an operation on the input unit 15.

The input support apparatus 1 of the present embodiment displays, in color, areas on the pitch-time plane 140 corresponding to keys of the keyboard 142 that indicate the constituent music notes of a chord of the chord sequence 143, the chord corresponding to the display position of the song position pointer 144. For example, in the example of FIG. 4, the song position pointer 144 is displayed at the position corresponding to the chord C major. The input support apparatus 1 displays, in color, keys corresponding to the notes "C", "E", and "G", which are the constituent music notes of the chord C major. In FIG. 4, diagonal-line hatching indicates coloration. As shown in FIG. 4, a range of keys that may be displayed in color is not limited to a specific octave. For example, when the keys corresponding to the note "C" are to be displayed in color, keys that indicate "C3", "C5", etc. are also displayed in color, along with the key indicating "C4".

As shown in the example of FIG. 4, by use of the input support apparatus 1 of this embodiment, the keys indicating note pitches corresponding to the constituent music notes of the chord C major, which chord corresponds to the display position of the song position pointer 144, are displayed in color. Thus, in a case where the input support apparatus 1 is used for composing music in a class, a user, such as a pupil, who is to compose music is able to distinguish between keys that indicate notes corresponding to the constituent music notes of the chord C major and keys that indicate notes not corresponding to the constituent music notes of the chord C major. As a result, the pupil is easily able to understand that the notes C, E, and G, which are the constituent music notes of the chord C major, are preferred choices. The pupil will then select a note pitch that he/she likes, from among the preferred pitch choices of the notes C, E, and G. Thereafter, the pupil inputs a music note into an area that represents the selected note pitch, the area corresponding to the display position of the song position pointer 144 in the piano roll 141 (in this case, the area corresponding to the measure corresponding to the chord C major). In this way, a melody can be created that is appropriate for the chord C major accompaniment in the chord C major measure.

Next, it is assumed that the pupil moves the song position pointer 144 to the position corresponding to the chord G major, next to the chord C major in the chord sequence 143. When the song position pointer 144 moves to the position of the chord G major, i.e., when the display position of the song position pointer 144 corresponds to the chord G major, the input support apparatus 1 displays, in color, keys corresponding to "G", "B", and "D", which are the constituent music notes of the chord G major. Similarly to the case described above in which the chord C major is used as an example, the pupil selects a note pitch from among the preferred pitch choices of the notes G, B, and D, and inputs a music note in an area that represents the selected note pitch, the area corresponding to the measure corresponding to the chord G major in the piano roll 141.

In this way, the pupil inputs music notes into the piano roll 141 to create a melody for the entire music piece, while moving the song position pointer 144 along the chord progression represented by the chord sequence 143 and referring to the keys displayed in color.

When another music piece is to be created, a user who is to teach or assist music composition (e.g., a teacher in a composition class) first prepares chord progression information 132 that indicates the chord progression of the accompaniment of the new to-be-created music piece. Then, once the input support apparatus 1 displays the chord sequence 143 based on the new chord progression information 132, the pupil will input music notes by referring to the keys displayed in color, as described above.

Figure 5:
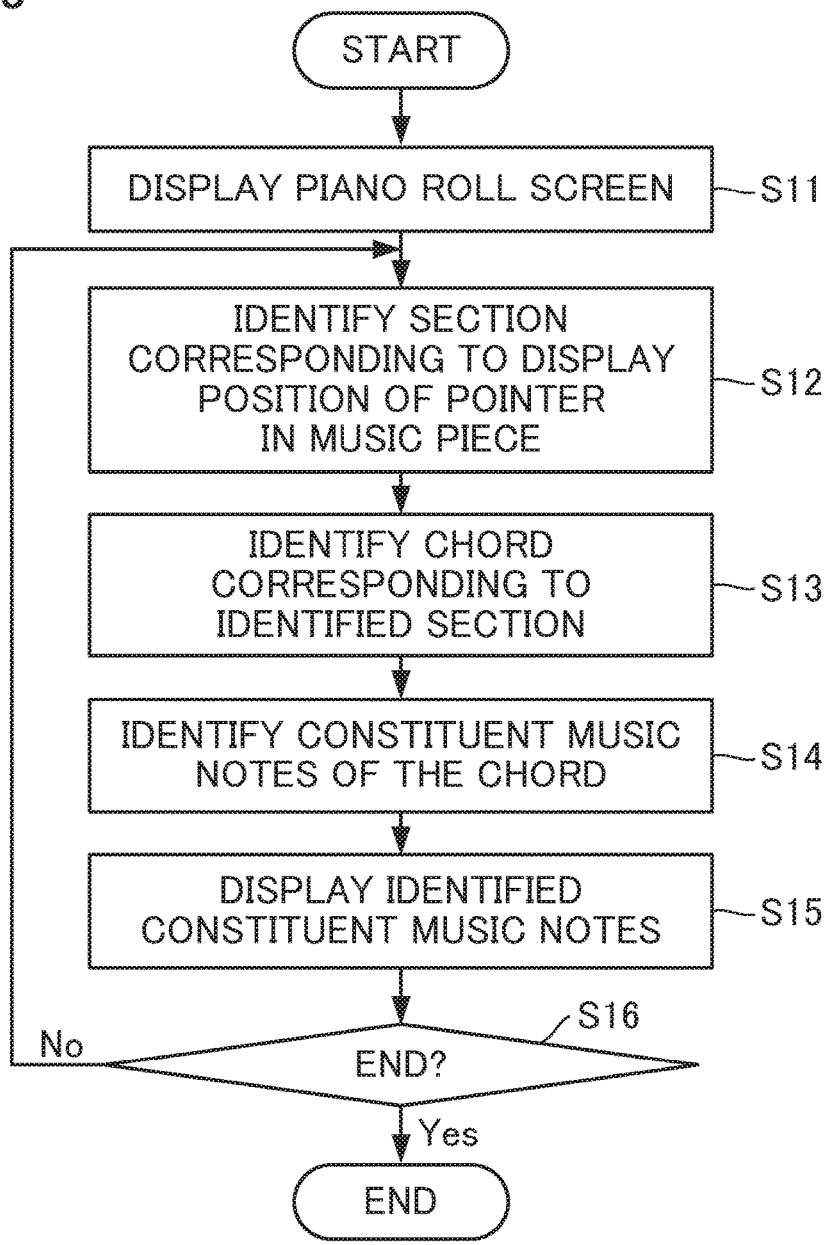
FIG. 5 is a flowchart illustrating the flow of processing that is executed by a controller 11 of the input support apparatus 1 in accordance with a chord display program 131.

Next, an operation by which constituent music notes are displayed will be described. FIG. 5 is a flowchart illustrating the flow of processing that the controller 11 of the input support apparatus 1 executes according to the chord display program 131. After receiving an activation instruction via the input unit 15, the controller 11 starts executing the chord display program 131.

First, the controller 11 causes the display unit 14 to display a piano roll screen (specifically, the pitch-time plane 140 (the piano roll 141 and the keyboard 142), the chord sequence 143, and the song position pointer 144) (step S11). Here, the controller 11 also retrieves the chord progression information 132 and causes the display unit 14 to display the content of the chord progression information 132 in the display area of the chord sequence 143. The song position pointer 144 is displayed at its initial position (e.g., the left end of the piano roll 141).

Next, the controller 11 identifies a section that corresponds to the display position of the song position pointer 144 in the music piece (step S12). More specifically, the controller 11 detects a positional coordinate of the song position pointer 144 and, from the positional coordinate, calculates the display position of the song position pointer 144 in the piano roll 141. If the song position pointer 144 is in the initial position, the position indicating the left end of the piano roll 141 will be calculated. The controller 11 identifies the section number of the section that corresponds to the display position of the song position pointer 144, the section number starting from the beginning of the music piece. For example, when the predetermined time length is a beat, the controller 11 identifies to which beat, from the first music note (including a rest) in the music piece, an area corresponds, in which area the song position pointer 144 is located and into which area a music note at that beat is to be input.

Next, the controller 11 identifies a chord that corresponds to the section identified in step S12 according to the chord progression information 132 (step S13). More specifically, the controller 11 identifies a chord corresponding to a field number that corresponds to the section number identified in step S12 and has started from the first field in the chord progression information 132. For example, when the section number identified in step S12 is 1, the controller 11 identifies that "C" written in the first field in the second line of the chord progression information 132 is the current chord.

Next, the controller 11 identifies constituent music notes that correspond to the chord identified in step S13 by referring to the chord table 133 (step S14). For example, when the chord C major is identified in step S13, the controller 11 identifies the notes C, E, and G, which are associated with the chord C major, by referring to the chord table 133.

Next, the controller 11 causes the display unit 14 to display the constituent music notes identified in step S14 on the screen (step S15). More specifically, the controller 11 causes the display unit 14 to display keys of the keyboard 142 representing the identified constituent music notes in a color different from the color of the other keys of the keyboard 142. For example, the controller 11 causes the display unit 14 to display all the keys representing the note C, all the keys representing the note E, and all the keys representing the note G, in color.

Subsequently, the controller 11 determines whether an instruction indicating the termination of the chord display program 131 has been input (step S16). When the instruction indicating the termination has been input (step S16: Yes), the controller 11 ends the chord display program 131. When the instruction indicating the termination has not been input (step S16: No), the controller 11 returns to step S12 and periodically repeats the processes of steps S12 to S16.

Although not described in the flowchart of FIG. 5, when the controller 11 acquires from the input unit 15 data indicating the content of an operation in which the song position pointer 144 is moved, the controller 11 performs an interruption process to allow the song position pointer 144 to move. Similarly, when the input of a music note into the piano roll 141 is detected, the controller 11 performs an interruption process to allow the music note to be input into the piano roll 141.

As described above, the controller 11 (the display controller 111 of the controller 11) of the input support apparatus 1 according to this embodiment causes the display unit 14 to display the pitch-time plane 140 including the piano roll 141 and the keyboard 142, the chord sequence 143, and the song position pointer 144 indicating a playback position on the time-axis along the chord sequence 143. The controller 11 (the identifier 112 of the controller 11) then identifies the constituent music notes of a chord corresponding to the display position of the song position pointer 144 along the chord sequence 143. The controller 11 (the display controller 111 of the controller 11) causes the display unit 14 to display areas on the pitch-time plane 140 corresponding to keys of the keyboard 142, each key indicating a corresponding one of the identified constituent music notes of the chord, in a color different from the color of areas on the pitch-time plane 140 corresponding to the other keys of the keyboard 142. In this way, the constituent music notes of the chord corresponding to the display position of the song position pointer 144 are distinctively displayed on the keyboard 142 of the pitch-time plane 140. Thus, compared with an input support apparatus that simply displays a pitch-time plane but does not display areas (e.g., keys of a keyboard of the pitch-time plane) corresponding to the constituent music notes of the accompaniment chords differently from other areas (other keys), GUI functionalities of the input support apparatus 1 of the present embodiment are improved.

By using the improved GUI, a user who is to compose music is prompted to select a music note (more precisely, note pitch) from among the displayed constituent music notes and to input the selected music note. For example, when the input support apparatus 1 is used in a composition class, the user (e.g., a pupil) will be able to understand preferred pitch choices of music notes by viewing the displayed chord constituent music notes. Since preferred note pitch choices that are displayed are narrowed down to those corresponding to constituent music notes of a chord, the pupil can select note pitches that he/she likes from pitches corresponding to the chord constituent music notes and input the selected music notes. Accordingly, the pupil, who is a user to compose music, is greatly assisted in composing music and a burden on the pupil will be reduced, as compared with a case where a pupil is required to select a music note from among all possible music notes. Furthermore, since constituent music notes are displayed in this manner, only the chord progression information 132 needs to be created in advance, and there is no need for a user, such as a teacher in a composition class, who is to teach or assist music composition to prepare a material, such as a handout, that shows a correspondence between chords and their respective constituent music notes. Thus, by using the support apparatus 1, the teacher is greatly assisted in teaching or assisting music composition and a burden on the teacher will be reduced, as compared with a case where such a teacher is required to separately prepare material showing a correspondence between chords and their constituent music notes.

In the input support apparatus 1, the choices of music notes that are preferable for playing in a melody are narrowed down to the constituent music notes and are displayed on the keyboard 142. Since a user who is to compose music only needs to select music notes to be played in a melody from the displayed constituent music notes, the user is assisted in selecting music notes (that is, it is made easier for the user to select music notes) to play in a melody, as compared with a case where keys of the keyboard 142 corresponding to constituent music notes are not displayed differently from other keys. Moreover, by selecting music notes to be played in a melody from the displayed constituent music notes, the user is able to create a melody that is consonant with the accompaniment chords.

The input support apparatus 1 displays the pitch-time plane 140 and the chord sequence 143. Accordingly, by use of the input support apparatus 1, the user is able to input a music note at the display position of the song position pointer 144 in view of its relationship with the chords and the music notes at positions other than the display position of the song position pointer 144. Therefore, the input support apparatus 1 is very well suited for use in the composition of music.

By connecting a sound system that includes a musical instrument digital interface (MIDI) sound source and a speaker to the input support apparatus 1, music notes input to the piano roll 141 or the chords in the chord sequence 143 can be output as sounds. Accordingly, when the connected sound system sequentially plays the music notes on the piano roll 141 or the chords in the chord sequence 143, the user is not only able to easily create a melody with the use of the input support apparatus 1, but can also easily reproduce the created melody in a sound form regardless of his/her skill in playing a musical instrument.

In the embodiment described above, an example is given in which a user (e.g., a teacher in a composition class) prepares the chord progression information 132 and another user (e.g., a pupil in the composition class) inputs music notes by referring to the keys displayed in color. However, the above is only one example relating to a situation where the input support apparatus 1 is used in a composition class. The use of the input support apparatus 1 is not limited to the above example. A user who prepares the chord progression information 132 and a user who inputs music notes by referring to the keys displayed in color may be different persons or may be the same person.

Second Embodiment

Figure 6:
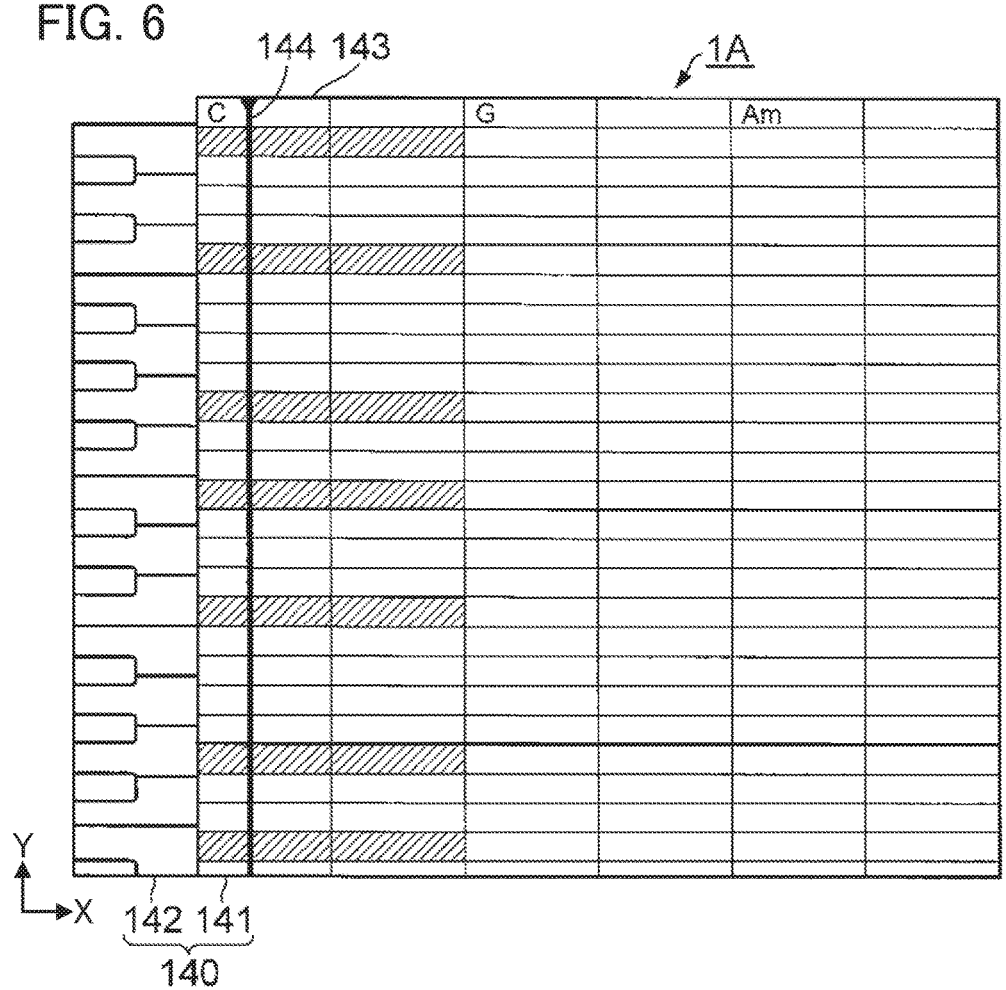
FIG. 6 is a diagram illustrating an example screen on a display unit 14 of an input support apparatus 1A according to a second embodiment of the present invention.

FIG. 6 is a diagram illustrating an example screen on a display unit 14 of an input support apparatus 1A according to a second embodiment of the present invention. The configuration of the input support apparatus 1A of the present embodiment is similar to the configuration of the input support apparatus 1 of the first embodiment. The input support apparatus 1A differs from the input support apparatus 1 in the display mode of chord constituent music notes with regard to specifics in the processing of step S15 in the flowchart shown in FIG. 5.

As illustrated in FIG. 6, the controller 11 (display controller 111) of the input support apparatus 1A displays areas of the piano roll 141 (i.e., areas on the pitch-time plane 140) that are near the song position pointer 144 and indicate the constituent music notes of the chord in a color different from the color of the other areas of the piano roll 141. For example, an area of the piano roll 141 that is near the song position pointer 144 may be a section during which the chord currently indicated by the song position pointer 144 continues. A section during which the chord continues can be determined from fields in the chord progression information 132, such as those in which the same chord is written successively, those in which no chord is written, or those in which a blank space is included. In the example shown in FIG. 6, areas of the piano roll 141 that represent the notes "C", "E", and "G", among areas of the piano roll 141 that correspond to one measure in which the chord C major continues, are displayed in color. Similarly to FIG. 4, in FIG. 6, diagonal-line hatching indicates coloration.

As described above, the input support apparatus 1A of the present embodiment displays areas of the piano roll 141, the areas located near the song position pointer 144 and indicating the constituent music notes of the chord corresponding to the display position of the song position pointer 144, in a color different from a color of other areas of the piano roll 141. Accordingly, a user who is to compose music can easily recognize constituent music notes of a chord since the notes are clearly displayed. Thus, the same advantages as those obtained in the first embodiment are obtained in the present embodiment.

Third Embodiment

Figure 7:
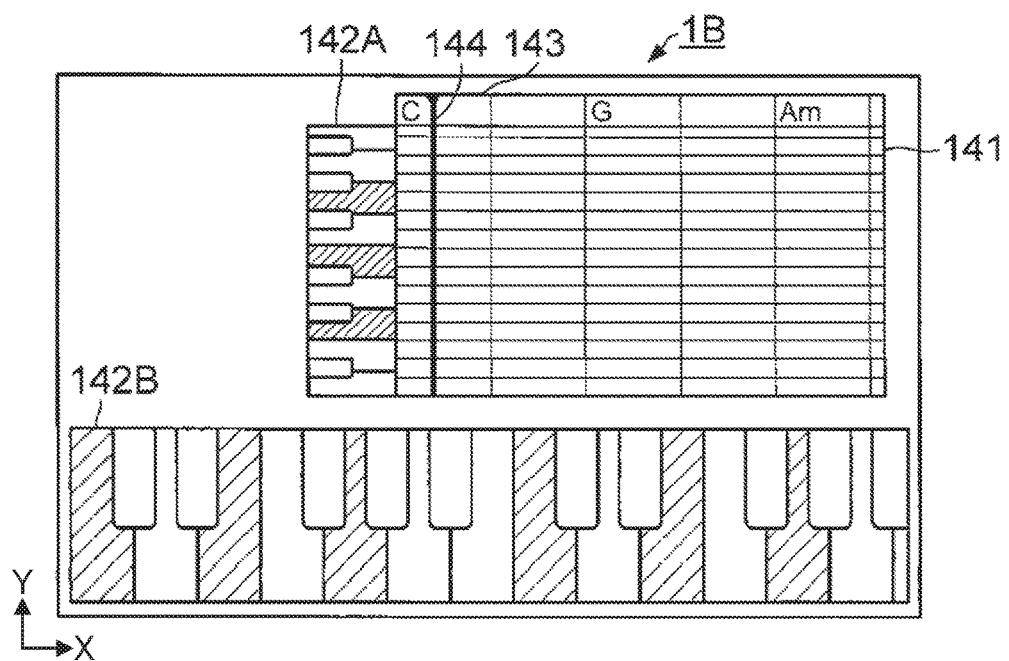
FIG. 7 is a diagram illustrating an example screen on a display unit 14 of an input support apparatus 1B according to a third embodiment of the present invention.

FIG. 7 is a diagram illustrating an example screen on a display unit 14 of an input support apparatus 1B according to a third embodiment of the present invention. The configuration of the input support apparatus 1B of the present embodiment is similar to the configuration of the input support apparatus 1 of the first embodiment. The input support apparatus 1B differs from the input support apparatus 1 in terms of the display mode of the piano roll screen with regard to specifics in the processing of step S11 in the flowchart shown in FIG. 5, and the display mode of constituent music notes, namely, with regard to specifics in the processing of step S15 in the flowchart shown of FIG. 5.

As illustrated in FIG. 7, the controller 11 of the input support apparatus 1B is similar to that of the input support apparatus 1 of the first embodiment in that it causes the display unit 14 to display the piano roll 141, the chord sequence 143, and the song position pointer 144 on the screen in step S11. However, the controller 11 (display controller 111) of the input support apparatus 1B is different from that of the input support apparatus 1 of the first embodiment in that the controller 11 causes the display unit 14 to display two keyboards on the screen in step S11, the two keyboards including a first keyboard 142A and a second keyboard 142B, the second keyboard 142B being different from the first keyboard 142A.

The first keyboard 142A is a keyboard similar to the keyboard 142 displayed in the first embodiment and is displayed coupled to the piano roll 141. That is, the piano roll 141 and the first keyboard 142A form the pitch-time plane. In FIG. 7, as in FIG. 4, the Y-axis corresponds to the pitch-axis of the pitch-time plane.

The second keyboard 142B is displayed below the piano roll 141. The keys of the second keyboard 142B are arranged such that the horizontal direction (the X-axis direction) of the second keyboard 142B corresponds to the high-low direction of the note pitch (the pitch-axis direction of the second keyboard 142B). The second keyboard 142B is arranged on the screen to have a view similar to that which would be seen by a person playing a keyboard instrument. Each key (each note pitch) of the second keyboard 142B is associated with a corresponding one of the keys (the corresponding note pitch) of the first keyboard 142A.

As illustrated in FIG. 7, in step S15, the controller 11 (display controller 111) of the input support apparatus 1B causes the display unit 14 to display keys of the first keyboard 142A that indicate the constituent music notes of the chord corresponding to the display position of the song position pointer 144 in a color different from a color of the other keys of the first keyboard 142A, and causes the display unit 14 to display keys of the second keyboard 142B that indicate those constituent music notes in a color different from that of the other keys of the second keyboard 142B. In the example of FIG. 7, the song position pointer 144 indicates the chord C major. Thus, the keys of the first keyboard 142A indicating the notes "C", "E", and "G" and the keys of the second keyboard 142B indicating the notes "C", "E", and "G" are displayed in color. Similarly to FIG. 4, in FIG. 7, diagonal-line hatching indicates coloration.

As described above, in the input support apparatus 1B of the present embodiment, the constituent music notes of the chord corresponding to the display position of the song position pointer 144 are displayed on the first and second keyboards 142A and 142B. Accordingly, a user who is to compose music can easily recognize the constituent music notes of a chord by viewing the displayed notes. Thus, the same advantages as those of the first embodiment are obtained in the present embodiment.

Furthermore, in the input support apparatus 1B, the constituent music notes are also displayed on the second keyboard 142B, which is arranged on the screen to have a view similar to that of a person playing a keyboard instrument. In this way, the user can understand the constituent music notes even more intuitively than where the input support apparatus 1 of the first embodiment is used.

Additionally, in the input support apparatus 1B, the constituent music notes are displayed both on the first and second keyboards 142A and 142B. In this way, compared with a case where the constituent music notes are displayed on the second keyboard 142B alone, a possibility is lowered that a music note may be input into an area that is not correct, i.e., an area representing a note that is not intended to be played.

Other Embodiments

Description has been given above of the first to third embodiments of the present invention. The present invention also embraces other embodiments. Examples of such other embodiments are described below.

(1) The controller 11 of the input support apparatus 1 of the first embodiment displays, in color, the entire area of each of keys corresponding to constituent music notes. However, the present invention is not limited to display in color of the entire area of the keys. As long as the keys of the constituent music notes are distinguishable from other keys, the keys may be displayed in any manner. Only a portion of each of the keys of the constituent music notes may be displayed in color; for example, each such key may be displayed with a colored circle mark. The same is applicable to the second and third embodiments. In short, the controller 11 may only perform processing that causes areas on the pitch-time plane that represent identified constituent music notes to be displayed differently from other areas on the pitch-time plane. More specifically, the controller 11 performs processing that causes keys of the keyboard 142 that indicate identified constituent music notes to be displayed differently from other keys of the keyboard 142, or the controller 11 performs processing that causes areas of the piano roll 141, the areas indicating identified constituent music notes and located near the song position pointer 144, to be displayed differently from other areas of the piano roll 141.

(2) In the embodiments described above, the fields separated by commas in the chord progression information 132 correspond to beats. However, the fields separated by commas in the chord progression information 132 may instead correspond to measures or to half-measures, for example. In a case where a music piece is created in which chords are not switched by a time length shorter than a measure, use of a modification by which fields separated by commas correspond to measures will enable the chord progression information 132 to be written concisely. Alternatively, with use of a modification by which fields separated by commas correspond to half-measures, it is possible to accurately express a music piece in which chords are switched at an off-beat or by a time length of a dotted music note.

(3) In the input support apparatus 1B of the third embodiment, the constituent music notes are displayed on both the first and second keyboards 142A and 142B. However, the constituent music notes may be displayed on the second keyboard 142B alone, omitting the display of the constituent music notes on the first keyboard 142A.

(4) The technical features of each embodiment may be combined. For example, the first and second embodiments may be combined, and the constituent music notes may be displayed on both the keyboard 142 and in areas of the piano roll 141 near the song position pointer 144.

(5) The chord progression information 132 may include information that specifies chords derived from a specific scale (e.g., the Okinawan scale). In this case, by storing, in advance, in the chord table 133 chords based on a specific scale and their constituent music notes, the controller 11 is able to cause the display unit 14 to display the constituent music notes on the keyboard 142 and/or the piano roll 141.

(6) The chord progression information 132 may include information that specifies silent sections in which beats are counted as rests, and chords are not played. Specifically, a character or a symbol that indicates a silent section is written between commas in the chord progression information 132. Examples of such a character or a symbol that indicates a silent section include an alphabet letter (for example, "R") that is not used to indicate a note. In this case, information is stored in advance in the chord table 133, the information indicating that no note name corresponds to the character or the symbol indicating the silent section. When the song position pointer 144 is displayed at the position corresponding to the character or the symbol indicating the silent section, the controller 11 does not cause the display unit 14 to display in color the areas corresponding to any particular notes on the keyboard 142 or in the piano roll 141. In this way, a user who is to compose music is able to recognize that the song position pointer 144 is in a silent section.

(7) The controller 11 of each of the input support apparatuses 1, 1A, and 1B of the respective embodiments identifies constituent music notes by referring to the chord table 133. However, the controller 11 may identify the constituent music notes using a function or a program that analyzes a chord name to derive its constituent music notes.

(8) A method of creating the chord progression information 132 is not limited to a method in which a character indicating a chord is directly written in a CSV file. For example, a keyboard instrument may be connected to the input support apparatus as the input unit 15, and a user who is to teach or assist music composition (e.g., a teacher in a composition class) may play chords on the keyboard instrument in accordance with a chord progression that the user wishes to create. The played chords may then be converted into the chord progression information 132 in a format such as a CSV file.

(9) The input support apparatus may be provided with a communication unit that is connected to a network, and the chord progression information 132 and the chord table 133 may be acquired by download via the network. For example, the chord progression information 132 and the chord table 133 may be stored in a server apparatus, and the input support apparatus may download the chord progression information 132 and the chord table 133 from the server apparatus as necessary and load the same on the volatile storage device 12. According to this mode, there is no need to store the chord progression information 132 and the chord table 133 in the nonvolatile storage device 13.

(10) The chord display program 131 may be provided in a state of being installed on a computer, or may be provided in a state of being stored on a computer-readable storage medium, or may be provided by download via a network. Each process of the chord display program 131 may be realized by electrical circuitry.

(11) The present invention can be understood as an input support method for use in each of the input support apparatuses 1, 1A, and 1B of the respective embodiments, the method being executed by the corresponding controller 11. That is, the input support method includes: controlling a display unit to display a pitch-time plane that includes a pitch-axis and a time-axis, a chord sequence that is associated with the time-axis of the pitch-time plane, and a pointer that indicates a position on the time-axis along the chord sequence; identifying constituent music notes of a chord corresponding to a display position of the pointer along the chord sequence; and controlling the display unit to display areas on the pitch-time plane, each displayed area indicating a corresponding one of the identified constituent music notes of the chord, differently from other areas on the pitch-time plane. Each input support method thereby prompts a user who is to compose music to input a music note.

(12) The controller 11 of the input support apparatus 1A of the second embodiment causes areas of the piano roll 141, the areas located near the song position pointer 144 and indicating the constituent music notes of the chord corresponding to the display position of the song position pointer 144, to be displayed in color. However, the range of the areas of the piano roll 141 that are displayed in color to indicate constituent music notes need not be limited to within the areas near the song position pointer 144. That is, the controller 11 may cause areas of the piano roll 141, the areas being among areas that correspond to a time section for a chord other than the chord corresponding to the display position of the song position pointer 144 along the chord sequence 143, the areas indicating the constituent music notes of the other chord, to be additionally displayed differently from areas of the piano roll 141 that do not represent the constituent music notes of the other chord. For example, in the example screen shown in FIG. 6, the controller 11 causes, among the areas of the piano roll 141 under the chord C major, areas of the piano roll 141 that indicate the notes C, E, and G, which are the constituent music notes of the chord C major, to be displayed in color. Additionally, the controller 11 causes, among the areas of the piano roll 141 under the chord G major, areas of the piano roll 141 that indicate the notes G, B, and D, which are the constituent music notes of the chord G major, to be displayed in color, and furthermore, the controller 11 causes, among the areas of the piano roll 141 under the chord Am, areas of the piano roll 141 that indicate the notes A, C, and E, which are the constituent music notes of the chord Am, to be displayed in color. In summary, the controller 11 instead of causing there to be displayed in color only the areas of the piano roll 141 that indicate the constituent music notes of the chord corresponding to the display position of the song position pointer 144, the controller 11 causes areas of the piano roll 141 that indicate, for the chords along the entire chord progression, their constituent music notes to be displayed in color at once (simultaneously).

In this modification, the controller 11 does not need to perform processing to identify the chord corresponding to the display position of the song position pointer 144. The controller 11 sequentially identifies chords along the time-axis of the chord sequence 143, identifies the constituent music notes for these chords by referring to the chord table 133, and causes the display unit 14 to display these constituent music notes. In this modification, compared to the input support apparatus 1A of the second embodiment, a larger number of areas of the piano roll 141 are displayed in color, and thus, a processing load for the processing of the colored display will be greater. However, using this modification, a user who is to compose music is able to recognize at a glance the constituent music notes of each of the chords in a music piece, and accordingly the user can easily take into account a relationship between the accompaniment chords and music notes to be input throughout the entire music piece.

One aspect of the present invention provides a method for use in an input support apparatus. The method includes: controlling a display unit to display a pitch-time plane that includes a pitch-axis and a time-axis, a chord sequence that is associated with the time-axis of the pitch-time plane, and a pointer that indicates a position on the time-axis along the chord sequence; identifying constituent music notes that form a chord corresponding to a display position of the pointer along the chord sequence; and controlling the display unit to display areas on the pitch-time plane, each displayed area indicating a corresponding one of the identified constituent music notes of the chord, differently from other areas on the pitch-time plane.

According to the abovementioned method, the constituent music notes of the chord corresponding to the display position of the pointer are displayed on the pitch-time plane in a distinctive manner. Thus, compared with a method used in an input support apparatus that simply causes the apparatus to display a pitch-time plane but does not cause it to display areas corresponding to the constituent music notes of the accompaniment chords differently from other areas, the abovementioned method according to the present invention provides improved GUI functionalities of the input support apparatus 1 in which the subject method is used.

In using the abovementioned method, users who are to compose music are prompted to select a preferred music note from the distinctively displayed constituent music notes and to input the selected music note. For example, when the abovementioned method is used in a composition class, users, such as pupils, who are to compose music are able to recognize the choices of preferred notes by viewing the displayed constituent music notes. Since note pitch choices of preferred music notes are narrowed down to note pitches corresponding to the constituent music notes for display, the pupils can select with ease a preferred note pitch from note pitches corresponding to the constituent music notes and input a corresponding music note. Furthermore, since the constituent music notes are displayed in this manner, there is no need for a user, such as a teacher in the composition class, who is to teach or assist music composition to prepare a handout that shows a correspondence between chords and their constituent music notes. Therefore, by using the abovementioned method, a user who is to compose music as well as a user who is to teach or assist music composition are greatly assisted, and thus, a burden on these users can be reduced.

Preferably, the pitch-time plane includes a piano roll and a keyboard that is displayed coupled to the piano roll. The areas on the pitch-time plane include keys of the keyboard that indicate the identified constituent music notes of the chord, areas of the piano roll that correspond to the display position of the pointer and indicate the identified constituent music notes of the chord, or both the keys of the keyboard indicating the identified constituent music notes of the chord and the areas of the piano roll corresponding to the display position of the pointer and indicating the identified constituent music notes of the chord.

According to this aspect, advantages similar to those described above are obtained. Furthermore, in this aspect, the constituent music notes are distinctively displayed on the keys, areas of the piano roll, or both of them. Since the keys and the areas of the piano roll are arranged in relation to the pitch-axis of the pitch-time plane, a user who is to compose music can understand the constituent music notes more intuitively, compared with a case where the constituent music notes are displayed in areas irrespective of the pitch-axis.

Preferably, the controlling of the display unit to display the chord sequence includes controlling the display unit to display the chord sequence based on chord progression information that indicates multiple chords included in a music piece in an order that is in accordance with progress of the music piece, and the identifying of the constituent music notes includes: identifying a chord that corresponds to the display position of the pointer in the music piece according to the chord progression information; and identifying constituent music notes that correspond to the identified chord.

According to this aspect, the chord sequence is displayed based on the chord progression information, and the chord corresponding to the display position of the pointer is identified according to the chord progression information. Thus, in a case where the chord progression information is stored in a storage device in an editable manner, a user who is to teach or assist music composition is able to update the chord progression information or add another piece of chord progression information according to teaching content or teaching purposes.

Preferably, the identifying of the constituent music notes includes identifying the constituent music notes corresponding to the chord that is identified according to the chord progression information by referring to a chord table in which chords and constituent music notes of the chords are associated with each other.

According to this aspect, constituent music notes of a chord can be automatically identified by referring to the chord table. Thus, compared with a case where constituent music notes need to be identified manually, a burden on a user who is to teach or assist music composition will be reduced.

Preferably, the pitch-time plane includes the piano roll, the keyboard serving as a first keyboard, and a second keyboard that is different from the first keyboard. Furthermore, the controlling of the display unit to display the areas on the pitch-time plane includes controlling the display unit to display the keys of the first keyboard and keys of the second keyboard, the displayed keys of the first and second keyboards indicating the identified constituent music notes, differently from other keys of the first and second keyboards. In this aspect, a direction of a pitch-axis of the first keyboard may be different from a direction of a pitch-axis of the second keyboard.

Preferably, the second keyboard may be arranged to have a view similar to that of a person playing a keyboard instrument. In this way, a user who is to compose music is able to recognize the constituent music notes more intuitively as compared with a case where the constituent music notes are displayed on the first keyboard alone.

Preferably, the pitch-time plane includes a piano roll, and the controlling of the display unit to display the chord sequence includes controlling the display unit to display the chord sequence based on chord progression information that indicates multiple chords included in a music piece in an order that is in accordance with progress of the music piece. Furthermore, the identifying of the constituent music notes includes identifying, for each of the chords, constituent music notes that form each of the chords, and the controlling of the display unit to display the areas on the pitch-time plane includes controlling the display unit to display areas simultaneously on the pitch-time plane, the displayed areas indicating constituent music notes that are identified for the chords, differently from other areas on the pitch-time plane.

According to this aspect, areas on the pitch-time plane indicating constituent music notes of multiple chords in the music piece are displayed, simultaneously, differently from other areas on the pitch-time plane. In this way, a user who is to compose music is able to recognize, at a glance, the constituent music notes of the chords of the music piece. Accordingly, compared with a case where the constituent music notes of only a single chord are displayed differently, it is easier for the user to follow a shift in chords in the music piece together with the chords' constituent music notes.

Preferably, the pitch-time plane accepts input of a music note. In this aspect, the display unit, which displays the pitch-time plane, may be a device that has a function to accept input, such as a touch panel.

According to this aspect, a user who is to compose music can input music notes directly into the pitch-time plane using a finger or a touch pen while viewing constituent music notes displayed distinctively on the same pitch-time plane. Thus, compared with a case where the display unit does not have a function to accept input, the user can compose music with greater ease.

Another aspect of the present invention provides an input support apparatus. The apparatus includes: a display controller configured to control a display unit to display a pitch-time plane that includes a pitch-axis and a time-axis, a chord sequence that is associated with the time-axis of the pitch-time plane, and a pointer that indicates a position on the time-axis along the chord sequence; and an identifier configured to identify constituent music notes that form a chord corresponding to a display position of the pointer along the chord sequence, wherein the display controller controls the display unit to display areas on the pitch-time plane, each displayed area indicating a corresponding one of the identified constituent music notes of the chord, differently from other areas on the pitch-time plane.

According to this aspect, advantages similar to those described above with respect to the method are obtained.

DESCRIPTION OF REFERENCE SIGNS 1, 1A, 1B . . . input support apparatus; 11 . . . controller; 12 . . . volatile storage device; 13 . . . nonvolatile storage device; 131 . . . chord display program; 132 . . . chord progression information; 133 . . . chord table; 14 . . . display unit; 15 . . . input unit; 140 . . . pitch-time plane; 141 . . . piano roll; 142 . . . keyboard; 142A . . . first keyboard; 142B . . . second keyboard; 143 . . . chord sequence; 144 . . . song position pointer.

What is claimed is:

1. A method for use in an input support apparatus, the method comprising:
   controlling a display unit to display a pitch-time plane that includes a pitch-axis and a time-axis, a chord sequence that is associated with the time-axis of the pitch-time plane, and a pointer that indicates a position on the time-axis along the chord sequence;
   identifying constituent music notes that form a chord corresponding to a display position of the pointer along the chord sequence; and
   controlling the display unit to display areas on the pitch-time plane, each displayed area indicating a corresponding one of the identified constituent music notes of the chord, differently from other areas on the pitch-time plane,
   wherein the controlling of the display unit to display the chord sequence includes controlling the display unit to display the chord sequence based on chord progression information that indicates multiple chords included in a music piece in an order that is in accordance with progress of the music piece, and
   wherein the identifying of the constituent music notes includes: (i) identifying a chord that corresponds to the display position of the pointer in the music piece according to the chord progression information and (ii) identifying constituent music notes that correspond to the identified chord.

2. The method according to claim 1,
   wherein the pitch-time plane includes a piano roll and a keyboard that is displayed coupled to the piano roll, and
   wherein the areas on the pitch-time plane include keys of the keyboard that indicate the identified constituent music notes of the chord, areas of the piano roll that correspond to the display position of the pointer and indicate the identified constituent music notes of the chord, or both the keys of the keyboard indicating the identified constituent music notes of the chord and the areas of the piano roll corresponding to the display position of the pointer and indicating the identified constituent music notes of the chord.

3. The method according to claim 2,
   wherein the pitch-time plane includes the piano roll, the keyboard serving as a first keyboard, and a second keyboard that is different from the first keyboard,
   wherein the controlling of the display unit to display the areas on the pitch-time plane includes controlling the display unit to display the keys of the first keyboard and keys of the second keyboard, the displayed keys of the first and second keyboards indicating the identified constituent music notes, differently from other keys of the first and second keyboards.

4. The method according to claim 3,
   wherein a direction of a pitch-axis of the first keyboard is different from a direction of a pitch-axis of the second keyboard.

5. The method according to claim 1,
   wherein the identifying of the constituent music notes includes identifying the constituent music notes corresponding to the chord that is identified according to the chord progression information by referring to a chord table in which chords and constituent music notes of the chords are associated with each other.

6. The method according to claim 1,
   wherein the pitch-time plane includes a piano roll,
   wherein the controlling of the display unit to display the chord sequence includes controlling the display unit to display the chord sequence based on chord progression information that indicates multiple chords included in a music piece in an order that is in accordance with progress of the music piece,
   wherein the identifying of the constituent music notes includes identifying, for each of the chords, constituent music notes that form each of the chords, and
   wherein the controlling of the display unit to display the areas on the pitch-time plane includes controlling the display unit to display areas simultaneously on the pitch-time plane, the displayed areas indicating constituent music notes that are identified for the chords, differently from other areas on the pitch-time plane.

7. The method according to claim 1,
wherein the pitch-time plane accepts input of a music note.

8. An input support apparatus comprising:
a display controller configured to control a display unit to display a pitch-time plane that includes a pitch-axis and a time-axis, a chord sequence that is associated with the time-axis of the pitch-time plane, and a pointer that indicates a position on the time-axis along the chord sequence; and
an identifier configured to identify constituent music notes that form a chord corresponding to a display position of the pointer along the chord sequence,
wherein the display controller controls the display unit to display areas on the pitch-time plane, each displayed area indicating a corresponding one of the identified constituent music notes of the chord, differently from other areas on the pitch-time plane,
wherein the display controller is configured to control the display unit to display the chord sequence based on chord progression information that indicates multiple chords included in a music piece in an order that is in accordance with progress of the music piece, and
wherein the identification of the constituent music notes includes the identifier configured to: (i) identify a chord that corresponds to the display position of the pointer in the music piece according to the chord progression information and (ii) identify constituent music notes that correspond to the identified chord.

9. The input support apparatus according to claim 8,
wherein the pitch-time plane includes a piano roll and a keyboard that is displayed coupled to the piano roll, and
wherein the areas on the pitch-time plane include keys of the keyboard that indicate the identified constituent music notes of the chord, areas of the piano roll that correspond to the display position of the pointer and indicate the identified constituent music notes of the chord, or both the keys of the keyboard indicating the identified constituent music notes of the chord and the areas of the piano roll corresponding to the display position of the pointer and indicating the identified constituent music notes of the chord.

10. The input support apparatus according to claim 9,
wherein the pitch-time plane includes the piano roll, the keyboard serving as a first keyboard, and a second keyboard that is different from the first keyboard,
wherein the control of the display unit to display the areas on the pitch-time plane includes the display controller configured to control the display unit to display the keys of the first keyboard and keys of the second keyboard, the displayed keys of the first and second keyboards indicating the identified constituent music notes, differently from other keys of the first and second keyboards.

11. The input support apparatus according to claim 10,
wherein a direction of a pitch-axis of the first keyboard is different from a direction of a pitch-axis of the second keyboard.

12. The input support apparatus according to claim 8,
wherein the identification of the constituent music notes includes the identifier configured to identify the constituent music notes corresponding to the chord that is identified according to the chord progression information by referring to a chord table in which chords and constituent music notes of the chords are associated with each other.

13. The input support apparatus according to claim 8,
wherein the pitch-time plane includes a piano roll,
wherein the control of the display unit to display the chord sequence includes the display controller configured to control the display unit to display the chord sequence based on chord progression information that indicates multiple chords included in a music piece in an order that is in accordance with progress of the music piece,
wherein the identification of the constituent music notes includes the identifier configured to identify, for each of the chords, constituent music notes that form each of the chords, and
wherein the control of the display unit to display the areas on the pitch-time plane includes the display controller configured to control the display unit to display areas simultaneously on the pitch-time plane, the displayed areas indicating constituent music notes that are identified for the chords, differently from other areas on the pitch-time plane.

14. The input support apparatus according to claim 8,
wherein the pitch-time plane accepts input of a music note.

* * * * *